April 5, 1932. W. R. HUME 1,852,781
ELECTRIC WELDING APPARATUS
Filed Jan. 8, 1930  4 Sheets-Sheet 2
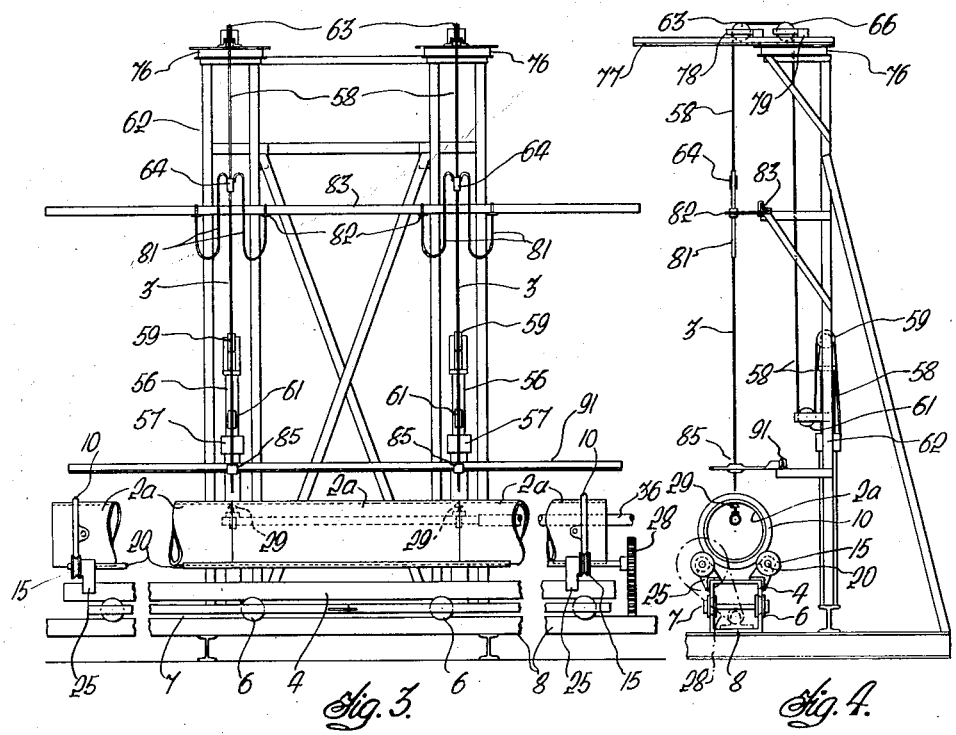
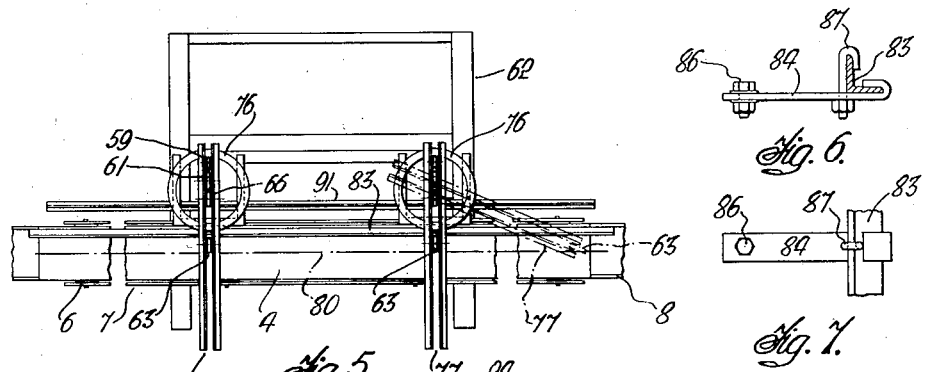
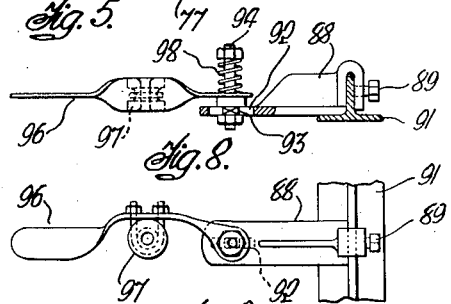
Inventor:
Walter Reginald Hume

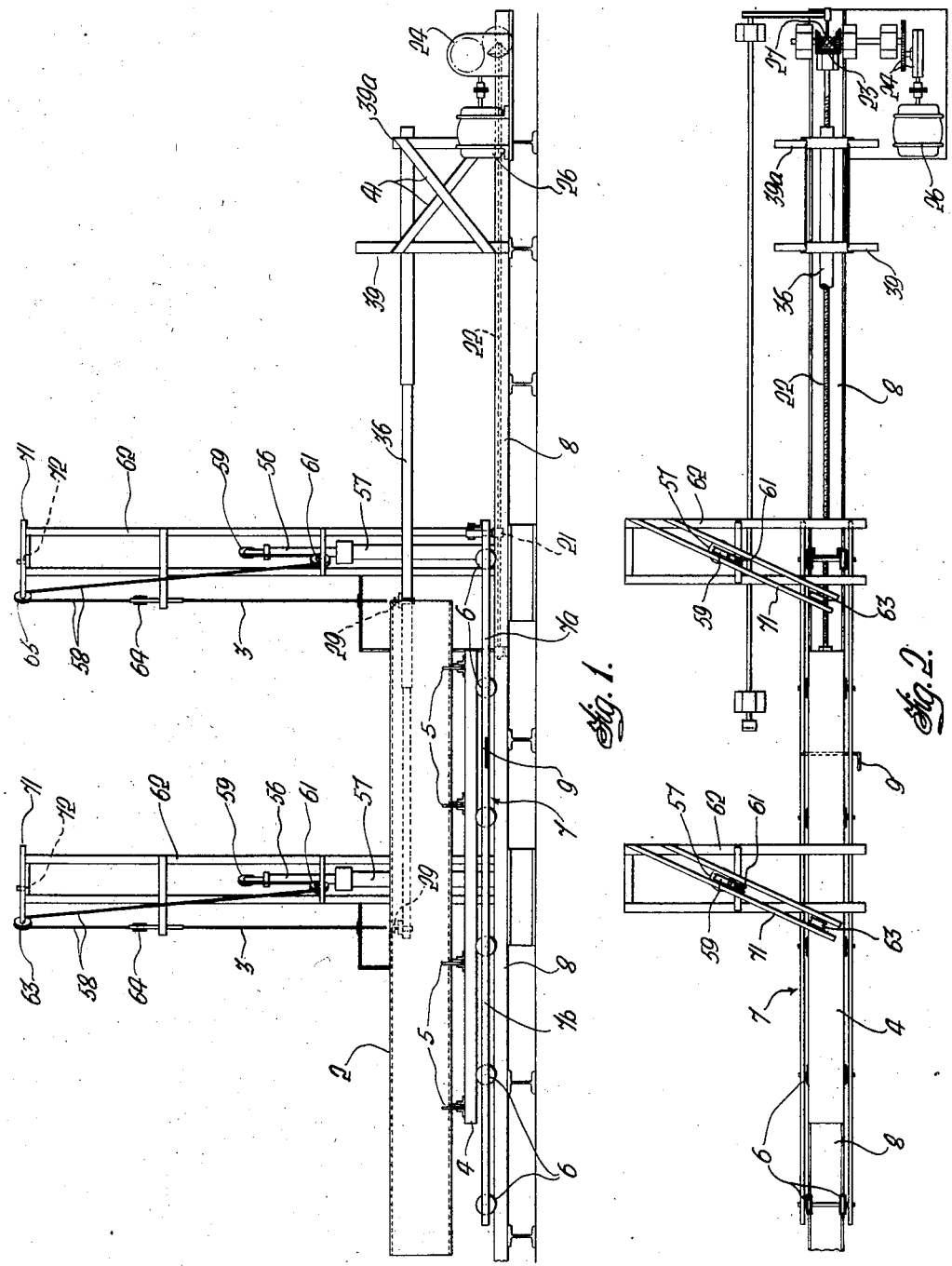

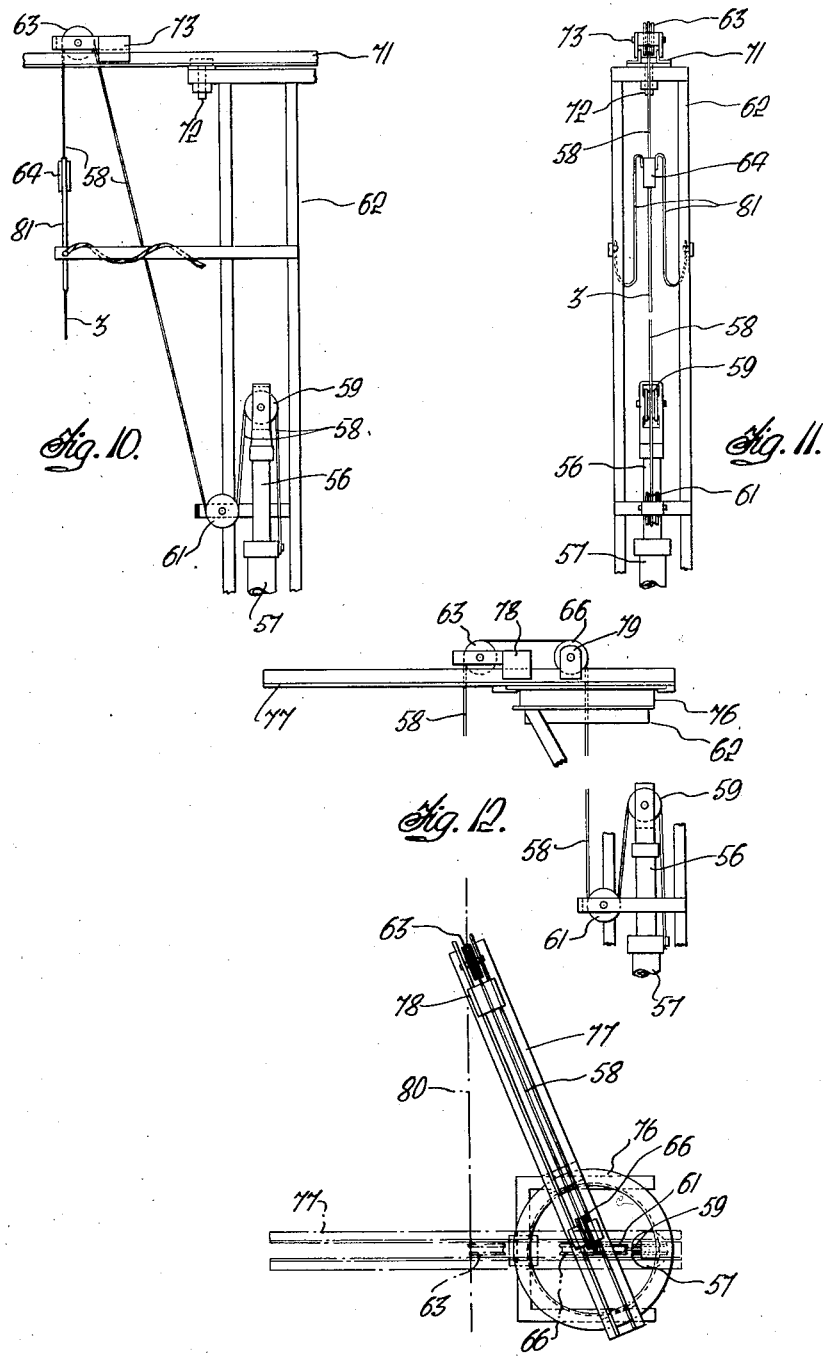

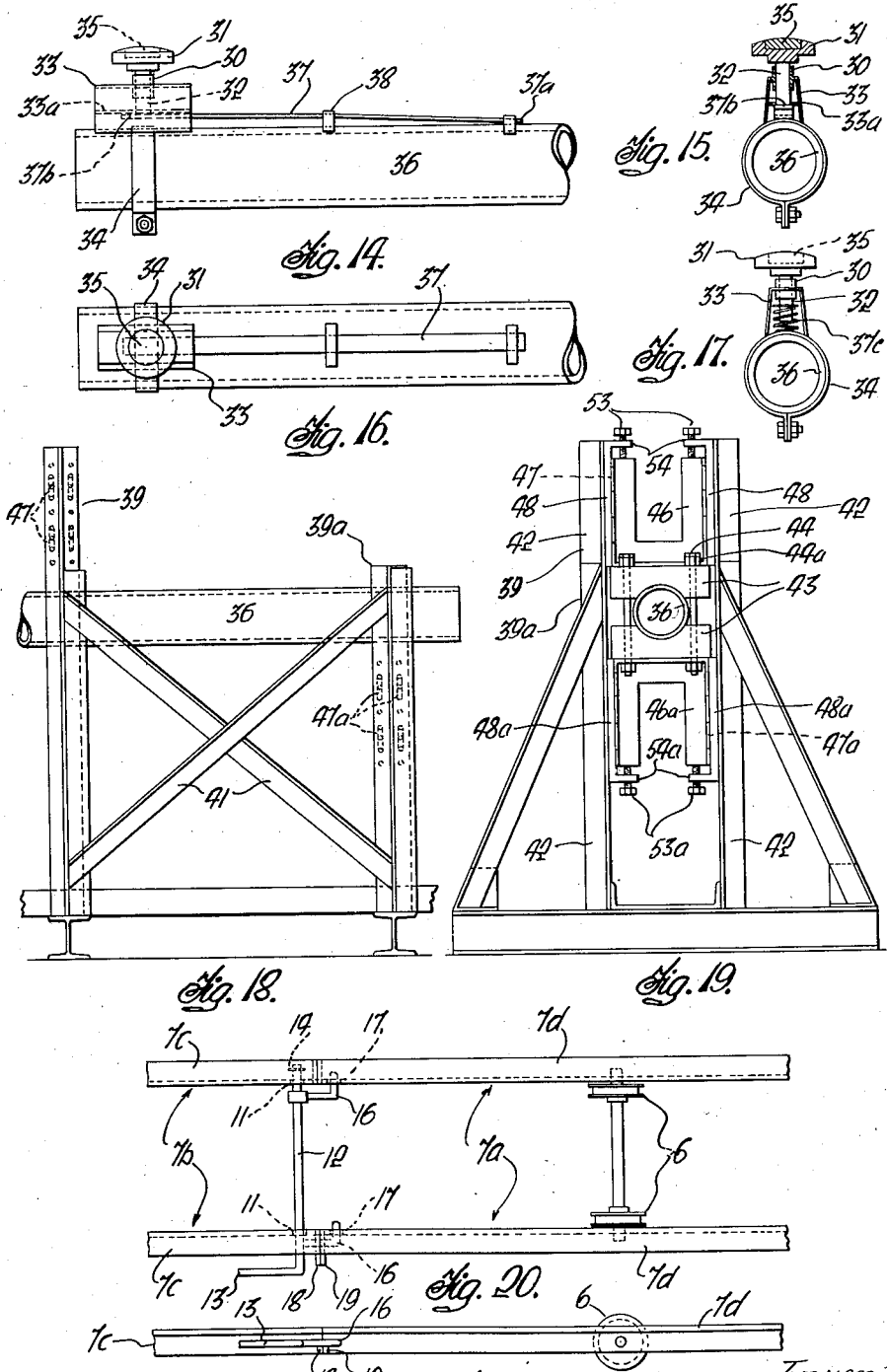

Patented Apr. 5, 1932

1,852,781

UNITED STATES PATENT OFFICE

WALTER REGINALD HUME, OF MELBOURNE, VICTORIA, AUSTRALIA

ELECTRIC WELDING APPARATUS

Application filed January 8, 1930. Serial No. 419,369.

This invention relates to electric welding apparatus and is particularly applicable but not limited to electric arc welding apparatus employing one or more fusible electrodes for welding together the longitudinal meeting edges of curved sheet metal blanks to be formed into pipes or like bodies, or for welding together the ends of two or more relatively short pipes or sections to form a longer pipe.

In apparatus of this general kind I have previously proposed and used backing members adapted to project into the interior of a pipe or like body and to engage the inner surface thereof adjacent the line of welding in order to prevent escape of the molten metal deposited from the electrode and to exercise a chilling effect upon the deposited metal. Such backing members have hitherto been in the form of metal blocks or of wheels but it has been found in practice that they do not always occupy a true or proper position but are liable to get out of alignment with the welding line and result in an imperfect welded joint.

One of the objects of the present invention is to provide in apparatus of the kind indicated an improved backing member and mounting means therefor whereby it will be assured that the backing member will in use always be correctly aligned with the welding line and held against the inner wall of the pipe or the like.

A further object is to provide an improved support for one or more of such backing members whereby they may be readily adjusted for use in connection with the welding of pipes or like bodies of different sizes, and also adjusted to coincide with the positions of two or more electrodes in instances where a plurality of electrodes are employed simultaneously on the same joint or piece of work, as for instance, when forming a longitudinal joint of a sheet metal pipe, or when joining three or more relatively short lengths of pipe into a comparatively long pipe by circumferential welding.

A still further object is to incorporate in apparatus of the general kind indicated wherein an electrode is fed to the work by hydraulic or fluid operated means, simple and effective means, such as a pulley and cable transmission device or arrangement, whereby the rate of feed of the electrode is a multiple of or considerably greater than the rate of feed of a hydraulic or fluid controlled plunger. By this means a relatively short plunger and cylinder may be employed and a steadier feed motion imparted to the electrode.

A still further object of the invention is to provide in welding apparatus of the kind where a plurality of electrodes are used simultaneously upon the same joint or piece of work, simple and effective means for adjusting the positions of the electrodes relative to each other so that the apparatus may readily and efficiently deal with pipes or bodies of varying lengths.

The invention also embodies an improved work supporting and traversing device comprising an under-carriage in two normally coupled longitudinal or fore and aft sections which may be speedily uncoupled to permit of quick and easy removal of the completed work, and recoupled to bring the next succeeding work into operative position.

The above and other objects, features and advantages of the invention, will however, be fully described in the following description aided by the accompanying drawings which form part of this specification. In these drawings, Figure 1 is a front elevation of an embodiment of welding apparatus in accordance with this invention particularly suitable for joining the longitudinally meeting edges of curved pipe blanks or the like by the simultaneous use of a plurality of electrodes.

Figure 2 is a plan of Figure 1 but omitting certain parts for the convenience of illustration.

Figure 3 is a contracted front elevation of an embodiment of welding apparatus in accordance with the invention particularly suitable for uniting the ends of three pipe sections by the simultaneous use of a plurality of electrodes.

Figure 4 is an end view of Figure 3.

Figure 5 is a plan of Figure 3, omitting certain parts for the convenience of illustration.

Figures 6 and 7 are detail views of an adjustable cable support seen in Figures 3 and 4.

Figures 8 and 9 are detail views of an adjustable electrode guide seen in Figures 3 and 4.

Figures 10 and 11 are fragmentary views on an enlarged scale of a pulley and cable device for transmitting motion with increased effect from a hydraulic plunger to an electrode as indicated in Figures 1 and 2.

Figures 12 and 13 are fragmentary views on an enlarged scale of a pulley and cable device for transmitting motion with increased effect from a hydraulic plunger to an electrode as indicated in Figures 3, 4 and 5.

Figures 14, 15 and 16 are detail views of a backing member and its mounting means according to the invention.

Figure 17 shows a modification of the backing member.

Figures 18 and 19 are side and end views respectively of means for supporting a bar carrying one or more of the backing members.

Figures 20 and 21 are fragmentary plan and side views respectively of an articulated work supporting and traversing carriage showing a coupling for uniting its fore and aft sections.

The work to be operated upon is represented in Figure 1 as a sheet metal pipe blank 2 the longitudinal meeting edges of which are to be welded together, and in Figures 3 and 4 as a plurality of pipe sections 2a the ends of which are to be circumferentially welded together. In each case the work is traversed either longitudinally or circumferentially in relation to one or more fusible electrodes 3 while it is resting upon a suitable support. This support may be of a similar nature to that disclosed in my co-pending application Serial No. 278,210 and include an upper carriage 4 of inverted channel shape in cross section the depending side flanges of which rest upon grooved wheels 6 of an undercarriage 7, the said wheels being adapted to track along the upstanding flanges of a track member 8 or a set of rails. The upper carriage 4 is provided at longitudinally spaced positions with suitable work supporting devices indicated by the numeral 5 in Figure 1.

In accordance with this invention the wheeled under-carriage 7 has two longitudinal or fore and aft sections 7a and 7b adapted to be connected by a suitable coupling device indicated by the numeral 9 in Figures 1 and 2, and shown more clearly in Figures 20 and 21. When the work under treatment has been completely welded the under-carriage sections are uncoupled and the aft section 7b is wheeled backwards carrying with it the upper carriage 4 and the completed work to a delivery station or site after which the next pipe or piece of work is placed upon the upper carriage, and the aft section of the undercarriage is wheeled forwardly and coupled to the fore section ready for the next welding operation. According to the constructions of the undercarriage illustrated in Figures 21 and 22 the side members 7c of one section, for instance, the aft section, are provided near their inner ends with co-aligned holes 11 to receive a transverse rod 12 which may have a handle 13 at one end and a stop 14 such as a collar or pin at the other end. This rod may have affixed thereto a pair of cranked or right angled coupling arms 16 the outer transverse portions of which are adapted to freely enter co-aligned holes 17 in the inner ends of the side members 7d of the fore section 7a and thus couple the sections of the undercarriage. The stop 14 on the rod 12 limits its uncoupling movement and the rod and coupling arms may be maintained in positions ready for coupling by a flange 18 projecting outwardly from one of the side members of the aft section and affording a rest for the adjacent coupling arm 16. Buffers 19 such as rubber or leather pads may be provided at the inner or meeting ends of the under-carriage sections.

In instances where the work requires to be traversed longitudinally the fore section 7a of the under-carriage is connected to any suitable operating mechanism which may be similar to that shown in the aforesaid co-pending application Serial No. 278,210. Such mechanism is indicated somewhat diagrammatically in Figures 1 and 2, and may include a divided nut 21 at the outer end of the fore section capable of engaging a screwed rod 22 connected at one end by mitre gearing 23 and suitable reduction gearing 24 with an electric motor 26. To obtain reverse motion of the screw and undercarriage a clutch 27 operable from a position convenient to the person in charge of the apparatus may be associated with the mitre gearing.

As the fore section 7a of the carriage is not required to carry the work into and out of welding position it is preferably comparatively short while the aft section 7b is comparatively long.

Where the work requires to be traversed circumferentially rings 10 may be clamped to the exterior of the pipe sections, as in Figures 3 and 4 and also as disclosed in co-pending application Serial No. 278,210, and adapted to run in the grooved peripheries of supporting and driving rollers 15 mounted on shafts 20 extending longitudinally at each side of the upper carriage 4 which may have gearings 25 supporting the shafts. Either or both shafts may be driven by suitable gearing 28 from a suitable source of power.

The backing members 29 in accordance with this invention for engaging the under surface of the work immediately beneath the line of welding are preferably of mushroom formation (see particularly Figures 14 and 17) each having a head 31 which is slightly domed or convex and a stem 32, and in any case are so mounted that they are free to turn or rotate about an axis approximately aligned with the electrode.

The head is positioned so that its top centre contacts with the inside or underneath surface of the work immediately beneath the electrode and the proposed line of welding so that if the point of contact between the head 31 and the work shifts to one side of the centre of the head, the backing member will be rotated by friction with the work so as to return the head to a truly central position. The head may be held against the work by a suitable spring.

According to the construction illustrated each backing member has its stem 32 extending freely through a sleeve 30 on an arched frame 33 secured at its lower end to a ring 34 adapted to be clamped around a bar 36 which extends longitudinally beneath or within the work and projects outwardly from one end thereof. In order to exercise a chilling effect upon the molten metal deposited from the electrode the head 31 of each backing member may be composed of copper or it may have a copper insert 35 as illustrated.

The spring for yieldingly pressing the backing member upwardly may consist, as seen in Figures 14, 15 and 16, of a strip 37 of spring metal anchored at one end 37a and adapted at its free end to engage the lower end of the stem 32. To limit the upward movement of the backing member derived from the spring the free end 37b thereof may be disposed beneath a horizontal web 33a of said arched frame which has a hole to pass the stem. The plate spring may also pass intermediately of its length through a guide 38 attached to the bar. According to Figure 17 the spring 37c is of the coiled type.

Where two or more electrodes operate simultaneously on the work a corresponding number of backing members may be mounted upon the bar as in Figures 1 and 3 and these backing members may be adjusted longitudinally of the bar by means of their clamping rings 34 to conform to the spacing of the electrodes.

The supporting means for the bar 36 is illustrated more clearly in Figures 18 and 19 and may comprise two spaced upstanding frames 39, 39a interconnected by ties 41. Adjustable vertically between side members 42 of each frame is a pair of jaws 43, adapted to be clamped onto the bar by bolts. The jaws 43 of the frame 39 may be secured by the bolts 44 to an upstanding U shaped bearer 46 provided in its side legs with vertically elongated slots 47. The bearer may be retained to opposite side plates 48 and the frame members 42 by bolts passing through the slots 47 and co-aligned vertically spaced holes in the side plates 48 and the members 42. Vertical adjustment of the bearer 46 and jaws 43 may be obtained by set screws 53 passing through lugs 54 at the tops of the side plates and engaging the tops of the bearer side legs.

The other pair of jaws 43 may be secured by bolts 44a to a bearer 46a having elongated slots 47a in its side legs and retained to side plates 48a and the frame members 42 by bolts passing through the slots 47a and vertically spaced holes in the side plates and in the members 42. Vertical adjustment of the bearer 46a and associated jaws 43 is also obtainable by set screws 53a passing through lugs 54a at the bottoms of the side plates and engaging the bottoms of the bearer side legs.

The feed of the electrodes is preferably controlled by hydraulic or fluid operated means and according to the drawings each electrode 3 is fed point downwards to the work under the influence of gravity acting on a plunger 56 in a cylinder 57 from which water is allowed to escape. The escape of water from each cylinder may be controlled automatically by a regulating valve (not shown) operated by a centrifugal governor driven by an electric motor connected into the welding circuit as disclosed in co-pending application Serial No. 278,210. Other forms of hydraulic means or fluid operated means may, however, be employed for feeding the electrode but in each case the hydraulic plunger or the fluid operated member is operatively connected to the electrode by means such that the rate of feed of the electrode is greater than the feed motion of the plunger or fluid operated member.

According to the drawings each electrode 3 is connected to its plunger 56 by medium of a flexible line, wire rope or cable 58 attached at one end to a stationary member beneath the top of the plunger such for instance as the respective cylinder 57. The cable passes upwardly therefrom around the upper part of a pulley or guide member 59 mounted on the top of the plunger, thence downwardly and around the lower part of a pulley or guide member 61 mounted on a stationary part such for instance as a frame 62. The cable then passes upwardly and around the upper part of another pulley or guide member 63 mounted on a stationary part such as the head of the frame 62 and thence downwardly to its point of attachment to the electrode 3 or to an arc striking solenoid 64 to which the electrode is attached. By such arrangement the rate of downward movement of the electrode will be double that of the plunger 56 enabling the employment of a relatively short plunger and cylinder 57 and ensuring a very steady feed motion of the electrode. If desired the portion of the cable between the pulley 63 and the electrode may be weighted but usually the weight of the electrode is sufficient to prevent any slackness in the cable.

The cable and pulley arrangement illustrated in Figures 3, 4, 12 and 13 is substantially the same as that just described but embodies another pulley or guide member 66 between the members 61 and 63 and level with the latter for a reason that will be apparent hereafter.

In cases where a plurality of electrodes are used simultaneously upon the same joint or piece of work it is desirable to provide for adjustment of the position or spacing of the electrodes so that they may be set to operate on pipes of different lengths. For instance if a pipe blank longer than that indicated in Figure 1 is to be longitudinally welded it will be evident that the electrodes should be spaced further apart than shown to enable each electrode to form one half of the joint. It will also be evident that the spacing of the electrodes will require to be varied from that shown in Figure 3 if pipe sections 2a of different lengths are to be circumferentially welded together at their ends.

To allow of such adjustment each pulley or guide member 63 disposed in vertical alignment above its electrode may be mounted upon a support 71 (Figures 1, 2, 10 and 11) pivoted to the head of the frame 62 about a vertical pin 72 or axis disposed in vertical alignment with the pulley or guide member 61, the pulley 63 being preferably carried by a bracket 73 adjustable lengthwise of the support 71. Thus by swinging the support 71 about its pivot and adjusting the bracket 73 along the support one electrode may be positioned closer to or further from the other electrode.

A modified construction of the means for permitting adjustment of the electrodes is illustrated in Figures 3, 4, 5, 12 and 13 and is applicable where longitudinal as well as circumferential welding is to be carried out. According to this embodiment a right angle cross sectioned ring 76 is provided at the top of the frame, the centre or axis of the ring being vertically aligned with the pulley or guide member 61. Capable of being turned around this ring is a support 77, such as two rails tied together, upon which are brackets 78, 79 carrying the pulleys 63, 66. The bracket 78 may be adjustable lengthwise of the support while the bracket 79 may be fixed and so disposed that the section of cable 58 between its pulley 66 and pulley 61 is substantially vertical and coincident with the centre of the ring 76. It will be evident that by swinging the support 77 about the ring and adjusting the bracket 78 longitudinally of the support the position of the respective electrode may be varied while maintaining it in alignment over the welding line 80 or centre of the work as indicated in Figures 5 and 13.

The arc striking solenoids 64 may be connected to a generator or source of current by cables 81 attached to holders 82 which are adjustable along a frame member 83 as seen in Figures 3, 4, 6 and 7 to suit the spacing of the electrodes. Each holder may comprise a plate 84 provided with a terminal 86 at one end, and having its other end turned back upon the member 83 and retained thereto by a hook bolt 87.

Adjustable guides 85 for the electrodes may each comprise a bracket 88 (Figures 8 and 9) attachable by a set screw 89 to a frame member 91 at the required position. The outer portion of the bracket may have a slot 92 for slidably accommodating a square or straight sided portion 93 of a pivot pin 94 about which an arm 96 may swing, this arm carrying a reel or hollow member 97 through which the electrode passes. The arm may be adjusted lengthwise by means of the slot and pin and may also be swung about the pin to permit of fine adjustments being made to secure accurate positioning of the tip of the electrode. Inadvertent movement of the arm may be prevented by a spring 98.

Having now described my invention what I claim as new and desire to secure by Letters Patent is:—

1. In electric welding apparatus, the combination of means for traversing the work beneath an electrode, a backing member having a domed surface adapted to contact with the underneath surface of the work, and a mount for said backing member whereby the latter is free to turn about an axis approximately in alignment with said electrode, for the purpose specified.

2. In electric welding apparatus, the combination of means for traversing the work beneath an electrode, a backing member having a domed head adapted to contact with the under surface of the work, a stem depending from said head, and a mount for rotatably accommodating the stem.

3. In electric welding apparatus, the combination of means for traversing the work in relation to an electrode, a backing member consisting of a stem having a convex end for contacting with the under surface of the work, a mount for rotatably supporting said stem and permitting endwise movement of the stem in the mount, and means acting directly on said stem for yieldingly holding the convex end thereof against the work.

4. In electric welding apparatus wherein the work is traversed in relation to an electrode, a backing member consisting of a stem of circular cross section for rotatably supporting in a mount, said stem having a convex end for contacting with the work beneath the electrode.

5. In electric welding apparatus wherein the work is traversed beneath an electrode, a backing member of substantially mushroom form having a domed head for contacting with the work beneath the electrode, and a depending stem whereby the backing member may be rotatably supported in a mount.

6. In electric welding apparatus, work supporting and traversing means, including a wheeled carriage having a comparatively short fore section, and a comparatively long aft section, means for detachably coupling said sections, and means connected with the fore section for traversing the coupled carriage.

7. In electric welding apparatus electrode feeding means, comprising a hydraulic cylinder, a plunger movable therein, a cable connected at one end to a stationary member and at the other end to an electrode to be fed point down to the work, the intermediate portion of the cable passing around a roller or guide member which moves with the plunger.

8. In electric welding apparatus electrode feeding means, comprising a vertically arranged cylinder, means for releasing fluid from the lower part of the cylinder, a plunger in said cylinder adapted to move downwardly by gravity during such release of the fluid, the upper end of the plunger projecting from the top of the cylinder, a first roller on said projecting portion of the plunger, second and third rollers mounted on stationary members, and a cable attached at one end to a stationary member and passing upwardly therefrom around the upper arc of the plunger roller, thence downwardly and around the lower arc of the second roller, thence upwardly around the upper arc of the third roller, and thence downwardly to a point of connection with an electrode.

9. In electric welding apparatus wherein a plurality of electrodes are simultaneously fed to the work at different points thereof; characterized in that the electrode feeding means includes a hydraulic plunger or fluid operated member operatively connected to an electrode by a flexible line or cable passing around a pulley or guide member which is aligned above the electrode, said pulley or guide being adjustably mounted so that the respective electrode may be positioned closer to or further from another electrode.

10. In electric welding apparatus wherein a plurality of electrodes are simultaneously fed to the work at different points thereof; characterized in that the electrode feeding means includes a hydraulic plunger or fluid operated member operatively connected to an electrode by a flexible line or cable passing around a pulley or guide member which is aligned above the electrode, and a pivoted frame for supporting said pulley or guide, the pulley or guide being adjustable lengthwise of said frame.

11. Apparatus in accordance with claim 10 wherein said frame is adapted to swing about a vertical axis approximately aligned with a stationarily mounted pulley or guide member disposed between the said adjustable pulley and the plunger or fluid operated member.

12. In electric welding apparatus electrode feeding means, comprising a plunger operating in a vertically arranged cylinder, a flexible line attached at one end to a stationary object and passing therefrom around a first pulley or guide member moving with said plunger, thence around a second pulley or guide which is stationarily mounted, and thence around a third pulley which is adjustably mounted, the other end of the cable being connected to the electrode beneath the third pulley.

13. Apparatus according to claim 12, wherein the third pulley is adjustable lengthwise of a frame which is adapted to be turned about an axis aligned with the second pulley, for the purpose specified.

14. In electric welding apparatus, work supporting and traversing means comprising an upper carriage, work holders on said carriage, an undercarriage fitted with wheels, the upper carriage having depending flanges resting upon said wheels, the under carriage comprising fore and aft sections adapted to be detachably interconnected, the fore section being considerably shorter than the aft section, and means connected to said fore section for traversing the coupled under carriage and the upper carriage with the work thereon.

15. In electric welding apparatus wherein two or more electrodes operate simultaneously on the work in spaced relationship, the combination with hydraulic electrode feeding means comprising a cylinder, a plunger working therein, a flexible and adjustable connection between said plunger and an electrode permitting adjustment of the electrode longitudinally of the work, of two or more backing members for contacting with the under surface of the work beneath the electrodes, and means for adjusting the positions of said backing members to conform to the spacing of said electrodes.

In testimony whereof I affix my signature.
W. R. HUME.